Aug. 17, 1965
J. G. RICHER
3,201,607
ELECTRONIC SWITCHING CIRCUIT
Filed Dec. 26, 1962
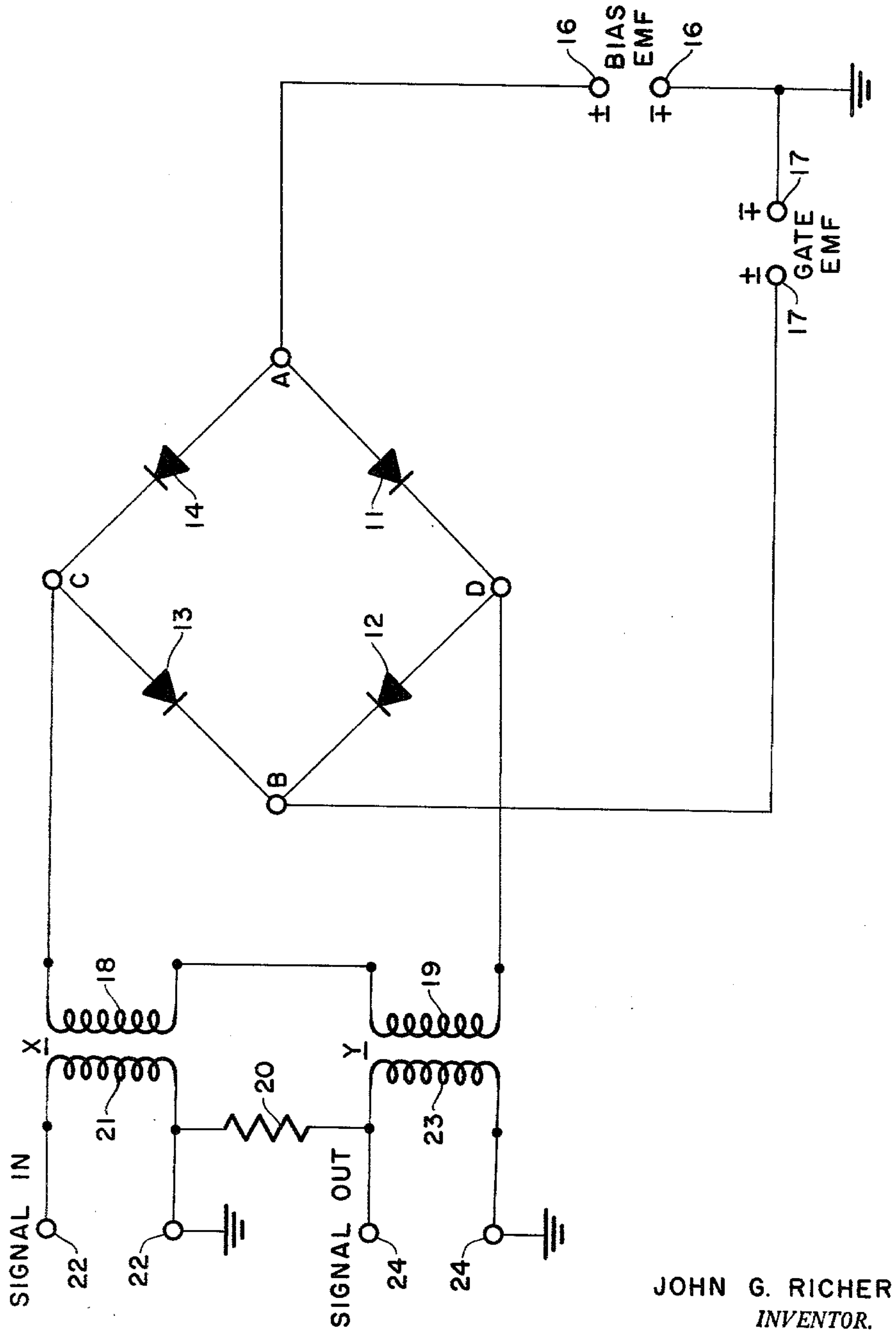
JOHN G. RICHER
*INVENTOR.*
BY J. M. St. Amand
ATTORNEY United States Patent Office 3,201,607
Patented Aug. 17, 1965

3,201,607
ELECTRONIC SWITCHING CIRCUIT

John G. Richer, Colton, Calif., assignor to the United States of America as represented by the Secretary of the Navy Filed Dec. 26, 1962, Ser. No. 247,422
4 Claims. (Cl. 307—88.5)
(Granted under Title 35, U.S. Code (1952), sec. 266)

The invention herein described may be manufactured and used by or for the Government of the United States of America for governmental purposes without the payment of any royalties thereon or therefor.

The present invention relates to electronic circuits and more particularly to electronic gate circuits.

The gating circuit of the present invention will gate signals of short duration, such as on the order of a fraction of to a few microseconds, with gating signals of any time duration. The present circuit has much versatility and can be operated in either a normally transmitting mode or, by reversing bias E.M.F. and gate signal E.M.F. polarities, in normally non-transmitting mode.

Previous gating circuits which handle comparable width pulses are not capable of operating in both normally transmitting and normally non-transmitting modes. There are previous gating circuits without the capability of operation in both the modes aforementioned that will handle both positive and negative signals, however, they require either a balanced dual polarity bias E.M.F. or a balanced gating E.M.F., or both; whereas, the circuit of the present invention requires only a single ended (mono polarity) bias and gating E.M.F.

It is an object of the invention, therefore, to provide a novel gating circuit which may be operated in either a normally transmitting mode or in a normally non-transmitting mode.

It is another object of the invention to provide a novel gating circuit for gating signals of short duration with gating signals of any time duration.

A further object of the invention is to provide a new electronic switching circuit that will handle both positive and negative signal polarities and require only a mono polarity bias and gating E.M.F.

Other objects and many of the attendant advantages of this invention will become readily appreciated as the same becomes better understood by reference to the following detailed description when considered in connection with the accompanying drawings wherein:

The figure of drawing is a circuit diagram showing an embodiment of the present invention.

A bridge network consisting of diodes 11, 12, 13 and 14 has its junction A connected to a source of bias E.M.F. that is applied at terminals 16. Junction B of the bridge network is connected to a source of gate E.M.F. that is applied at terminals 17. A pair of pulse transformers X and Y have their secondary windings 18 and 19 connected together in series and the two windings in series connected across junctions C and D of the diode bridge network; a damping resistor 20 is connected in series between the primary windings 21 and 23 of the transformers, as shown in the drawing. Damping resistor 20 is used to improve waveshape by improving pulse transformer characteristics. The signal in is applied across terminals 22 and the signal out is taken from across terminals 24. Primary winding 23 is used as the output coil of pulse transformer Y in this circuit arrangement, as shown in the drawing.

A bias E.M.F. applied at bias terminals 16 will put the gate circuit in either a transmitting or non-transmitting mode, depending upon the polarity of the bias E.M.F. The bias must be greater than the peak value of the input signal applied at terminals 22, however, it need only be just greater, i.e. sufficiently large enough to equal the peak value of the largest signal which will be encountered. The gate E.M.F, applied at terminals 17, whose amplitude is made greater than the sum of the bias E.M.F. plus the peak value of the signal E.M.F., reverses the mode of operation of the gate circuit because the gate E.M.F. is of the polarity required to oppose the bias E.M.F.

The operation of the circuit is as follows: When a bias E.M.F. is applied at terminals 16 (negative end to ground and positive end to junction A) and a gate E.M.F. is applied across terminals 17 (negative end to ground and positive end to junction B) the diode bridge network is operating in its normally TRANSMITTING mode. The bias causes a current to occur through the gate E.M.F. generator impedance and all the diodes, back to the positive terminals of the bias supply. Because, in this situation, all the diodes are conducting, the diode network between junctions C and D can be considered as a low resistance switch. Since junctions C and D are now within a few ohms of each other, the secondary of pulse transformer 18 handling the signal in is connected directly across the secondary of pulse transformer 19 handling the signal out.

If the gate E.M.F. is now made greater than the bias E.M.F., junction B will become more positive than junction A, with the result that the diodes 11, 12, 13 and 14 will now become back biased. When the diodes are back biased the junctions C and D are electrically isolated from each other, opening the circuit between the secondaries of pulse transformers 18 and 19; the gate circuit is now NON-TRANSMITTING.

Now, if the bias and gate E.M.F. polarities are reversed, the gate circuit will operate in its normally NON-TRANSMITTING mode. Conditions are simply the reverse of what they were before, with junction A now being made more negative than junction B by the bias with the result that the gate circuit is in a NON-TRANSMITTING mode. The gate E.M.F. still in opposition to the bias E.M.F makes junction B more negative than junction A (when the gate E.M.F. becomes greater than the bias E.M.F.), with the result that during the gating pulse, the gate circuit is put into a TRANSMITTING mode.

With the positive side of the bias and gate E.M.F. sources grounded the gate circuit is normally NON-TRANSMITTING, becoming transmitting when the gate E.M.F. exceeds the bias E.M.F. With the negative side of the bias and gate sources grounded, the gate circuit is normally TRANSMITTING, becoming non-transmitting when gate E.M.F. exceeds bias E.M.F.

If the resistance of the diodes 11, 12, 13 and 14 is approximately equal the diode network may be looked upon as similar to a Wheatstone bridge with junctions A and B serving as the input junctions while junctions C and D are the "output" or "null at balance" junctions. If all diode resistances are equal (or, more Wheatstone-bridge-like: the cross products of the impedances are equal) the bridge is balanced. Thus none of the output of the gate E.M.F source will appear across junctions C and D and hence the output is isolated from the gate E.M.F signal. This provides a pedestal free output.

The gate circuit of the present invention in addition to handling either polarity of input signal will handle a sine wave signal, and accommodates any gate signal width.

Obviously many modifications and variations of the present invention are possible in the light of the above teachings. It is therefore to be understood that within the scope of the appended claims the invention may be practiced otherwise than as specifically described.

What is claimed is:

1. An electronic switching circuit for gating signals of short duration with gating signals of any time duration and which operates in both normally transmitting and normally nontransmitting modes, comprising:

(a) first and second separate pulse transformers, the primary winding of each of said separate pulse transformers having one and connected to ground, (b) a damping resistor connected across the primary winding of said second pulse transformer.

(c) a diode bridge-rectifier network having a pair of input and a pair of output terminals, (d) the secondary windings of said transformers being connected together in series adding and across the input terminals of said diode bridge-rectifier network, (e) a pair of terminals to which a source of bias E.M.F. is applied connected between one of said pair of diode bridge output terminals and ground, (f) a pair of terminals to which a source of gate E.M.F. is applied connected between the other of said pair of diode bridge output terminals and ground, said gate E.M.F. being a signal of any width, and being any one of a sine wave signal and a D.C. signal of either polarity, (g) the signal input being applied across the primary winding of said first pulse transformer, (h) the signal output being taken from across the primary winding of said second pulse transformer, wherein said switching circuit will handle both positive and negative signal polarities and require only mono polarity bias E.M.F. and gate E.M.F.

2. An electronic switching circuit for gating signals of short duration with gating signals of any time duration and which operates in both normally transmitting and normally nontransmitting modes, comprising:

(a) first and second separate pulse transformers, the primary winding of each of said separate pulse transformers having one end connected to ground, (b) a means to improve waveshape by improving transformer characteristics connected across the primary winding of said second pulse transformer, (c) a diode bridge-rectifier network having a pair of input and a pair of output terminals, (d) the secondary windings of said transformers being connected together in series adding and across the input terminals of said diode bridge-rectifier network, (e) a pair of terminals to which a source of bias E.M.F. is applied connected between one of said pair of diode bridge output terminals and ground, (f) a pair of terminals to which a source of gate E.M.F. is applied connected between the other of said pair of diode bridge output terminals and ground, said gate E.M.F. being a signal of any width, and being any one of a sine wave signal and a D.C. signal of either polarity, (g) the signal input being applied across the primary winding of said first pulse transformer, (h) the signal output being taken from across the primary winding of said second pulse transformer, wherein said switching circuit will handle both positive and negative signal polarities and require only mono polarity bias E.M.F. and gate E.M.F.

3. An electronic switching circuit for gating signals of short duration with gating signals of any time duration and which operates in both normally transmitting and normally nontransmitting modes, comprising:

(a) first and second separate pulse transformers, the primary winding of each of said separate pulse transformers having one end connected to ground, (b) a means to improve waveshape by improving transformer characteristics connected across the primary winding of said second pulse transformer, (c) a diode bridge-rectifier network having a pair of input and a pair of output terminals, (d) the secondary windings of said transformers being connected together in series adding and across the input terminals of said diode bridge-rectifier network, (e) a pair of terminals to which a source of bias E.M.F. is applied connected between one of said pair of diode bridge output terminals and ground, (f) a pair of terminals to which a source of gate E.M.F. is applied connected between the other of said pair of diode bridge output terminals and ground, said gate E.M.F. being a signal of any width, and being any one of a sine wave signal and a D.C. signal of either polarity, (g) the signal input being applied across the primary winding of said first pulse transformer, (h) the signal output being taken from across the primary winding of said second pulse transformer, (i) the bias E.M.F. being sufficiently large to equal the peak value of the largest input signal applied across the primary of said first transformer, wherein said switching circuit will handle both positive and negative signal polarities and require only mono polarity bias E.M.F. and gate E.M.F.

4. An electronic switching circuit for gating signals of short duration with gating signals of any time duration and which operates in both normally transmitting and normally nontransmitting modes, comprising:

(a) first and second separate pulse transformers, the primary winding of each of said separate pulse transformers having one end connected to ground, (b) a means to improve waveshape by improving transformer characteristics connected across the primary winding of said second pulse transformer, (c) a diode bridge-rectifier network having a pair of input and a pair of output terminals, (d) the secondary windings of said transformers being connected together in series adding and across the input terminals of said diode bridge-rectifier network, (e) a pair of terminals to which a source of bias E.M.F. is applied connected between one of said pair of diode bridge output terminals and ground, (f) a pair of terminals to which a source of gate E.M.F. is applied connected between the other of said pair of diode bridge output terminals and ground, said gate E.M.F. being a signal of any width, and being any one of a sine wave signal and a D.C. signal of either polarity, (g) the signal input being applid across the primary winding of said first pulse transformer, (h) the signal output being taken from across the primary winding of said second pulse transformer, (i) the bias E.M.F. being sufficiently large to equal the peak value of the largest input signal applied across the primary of said first transformer, (j) the polarity of said bias E.M.F. determining the operating mode of the switching circuit from the normally transmitting and normally nontransmitting modes, wherein said switching circuit will handle both positive and negative signal polarities and require only mono polarity bias E.M.F. and gate E.M.F.

References Cited by the Examiner

UNITED STATES PATENTS

| | | | |
|---|---|---|---|
| 2,025,158 | 12/35 | Cowan | 332—47 |
| 2,827,564 | 3/58 | Hirsch | 307—88.5 |
| 2,911,544 | 11/59 | Ostendorf | 307—88.5 |
| 3,005,163 | 10/61 | Dulberger | 307—88.5 |

ARTHUR GAUSS, *Primary Examiner.*

GEORGE N. WESTBY, *Examiner.*